United States Patent [19]

Thompson

[11] 4,003,731
[45] Jan. 18, 1977

[54] NOZZLE FOR FLUIDS

[75] Inventor: Thomas K. Thompson, Granville, Ohio

[73] Assignee: Owens-Corning Fiberglas Corporation, Toledo, Ohio

[22] Filed: Apr. 26, 1976

[21] Appl. No.: 680,246

[52] U.S. Cl. .................. 65/12; 239/498; 239/502

[51] Int. Cl.² .......................... C03B 37/02

[58] Field of Search ........ 239/498, 499, 502, 518, 239/592; 65/1, 2, 12

[56] References Cited

UNITED STATES PATENTS

| 1,006,324 | 10/1911 | Werner | 431/353 |
|---|---|---|---|
| 2,121,802 | 6/1938 | Kleist et al. | 65/6 |
| 2,154,731 | 4/1939 | Crowley | 239/502 |
| 3,136,488 | 6/1964 | Petlak et al. | 239/592 X |
| 3,244,221 | 4/1966 | Labino | 48/180 |
| 3,905,790 | 9/1975 | Strickland | 65/2 |

FOREIGN PATENTS OR APPLICATIONS

| 149,628 | 4/1951 | Australia | 239/502 |

Primary Examiner—Robert L. Lindsay, Jr.
Attorney, Agent, or Firm—John W. Overman; Ted C. Gillespie

[57] ABSTRACT

A nozzle is disclosed in which streams of fluid are discharged from an apertured chamber into a skirt. The skirt has vanes to facilitate stream-like non-turbulent flow of the fluid. The skirt walls are divergent to allow for expansion of the fluid.

5 Claims, 3 Drawing Figures

U.S. Patent    Jan. 18, 1977    4,003,731
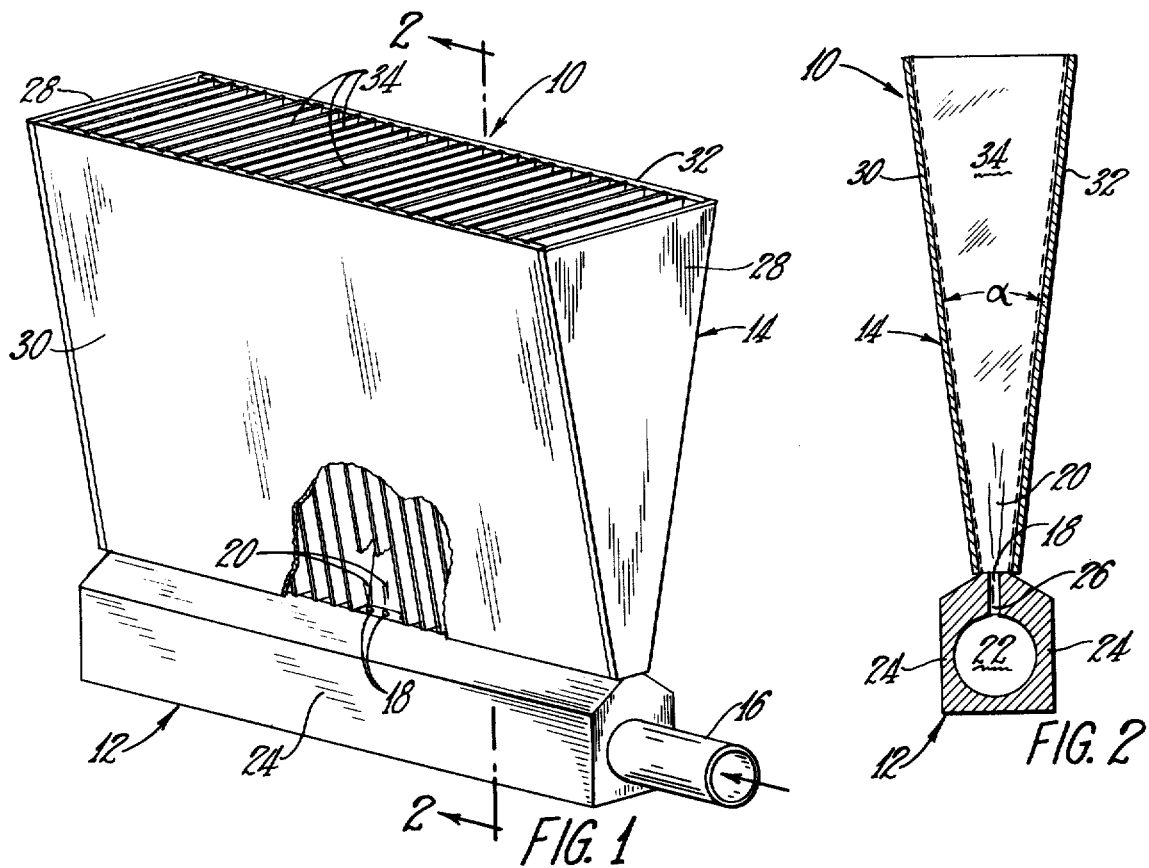
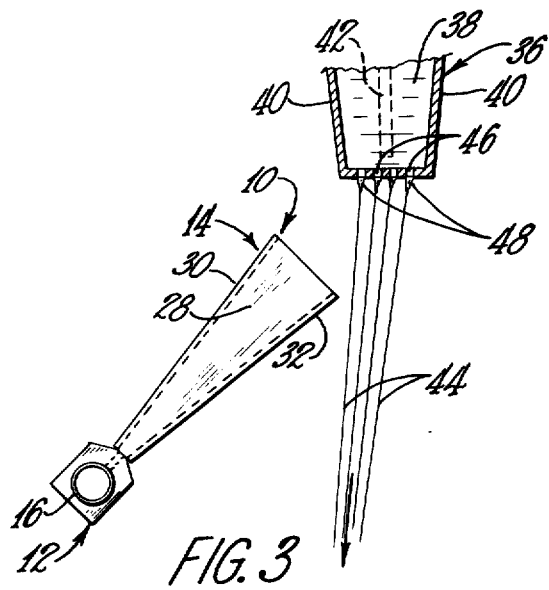

NOZZLE FOR FLUIDS

This invention relates to a nozzle for fluids. More specifically, this invention relates to a nozzle which can be used to introduce a fluid into contact with a fiber-forming bushing from which streams of glass are drawn.

Developments in the production of glass fibers have led to the utilization of streams of gas impinging upwardly on a fiber-forming bushing. The upwardly moving gas streams maintain separation between the streams of glass and prevent flooding of the bushing. The shape of the fiber-forming cones of glass formed at the orifices in the bushing is controlled by the cooling patterns of the gas streams. The controlled environment created by the gas streams prevents the overheating and subsequent flooding of individual fiber-forming cones. The upward movement of the gas streams serves to substantially eliminate the induction of air by the downwardly moving streams of glass. This lack of induced air-flow substantially reduces contact between the streams of glass and ambient air impurities. Also, the cooling effect of the gas streams serves to rapidly quench the glass streams. This rapid quench reduces the loss of volatiles from the glass and provides a more uniform, higher quality glass fiber.

It has been found that in order to adequately control fiber-forming bushings which are generally rectangular in shape a flow of air with a generally equal velocity distribution across the width of the bushing is advantageous.

According to this invention there is provided a nozzle for supplying and directing a stream of fluids.

Also, according to this invention there is provided a nozzle in combination with an elongated fiber-forming bushing. The nozzle supplies a fluid stream to the bushing where the velocity of the fluid stream is substantially uniform in at least one direction.

Also, according to this invention there is provided a nozzle in which an apertured chamber is adapted to receive a fluid. A conduit abuts the chamber and surrounds the apertures, and is thus adapted to receive fluid discharged from the apertures. The conduit has a rectangular cross-section along its entire length, and two opposing walls are non-parallel, forming a total angle of about 2° to about 30°. Vane means are mounted inside the conduit to facilitate stream-like non-turbulent flow. The vanes can be substantially parallel to the end walls of the conduit.

This invention will be more fully understood by reference to the following drawings:

FIG. 1 is a perspective view of a nozzle according to the principles of this invention.

FIG. 2 is a cross-sectional view of the nozzle as seen along section line 2—2 of FIG. 1.

FIG. 3 is a schematic of an end view of the nozzle shown in combination with a cross-sectional view of a fiber-forming bushing.

The following description of a specific embodiment of this invention utilizes air as the fluid conveyed. This description is not intended to be limiting, but rather is offered for purposes of illustration.

A preferred embodiment of nozzle 10 of this invention, as shown in FIG. 1, includes chamber 12 and skirt or conduit means 14. Conduit means 16 opens into chamber 12 to allow the introduction of air. Apertures 18 in chamber wall provide openings for the emission of streams of air 20.

As shown in FIG. 2, chamber 12 comprises a ductlike plenum 22 surrounded by walls 24. The apertures are connected to plenum 22 by passageways 26. The passageways are preferably adapted to emit air in parallel streams.

Skirt 14 is comprised of two end walls 28, which are preferably parallel, a front wall 30 and a rear wall 32. Front wall 30 and rear wall 32 are not parallel to each other, and form an angle of divergence, alpha, as shown in FIG. 2. The angle of divergence, alpha, can be within the range of from about 2° to about 30°.

Positioned within the skirt are vanes 34 for facilitating stream-like non-turbulent flow within the skirt. It has been found that the positioning of vanes within the skirt significantly reduces the tendency of streams of air to concentrate at the center of the nozzle, and facilitates the distribution of air across the whole nozzle. The number of vanes 34 can vary to the extent that anywhere from one up to 10 or more apertures 18 can be positioned to discharge air streams 20 into the space between adjacent vanes.

In the preferred embodiment the vanes are substantially parallel to end walls 28 of the skirt, as shown in FIG. 1. Other embodiments of this invention can utilize vanes in different arrangements to achieve different results. For example, the vanes could be oriented to direct a relatively larger amount of air flow toward a particular portion of the bushing in order to eliminate hot spots.

Referring now to FIG. 3, a nozzle 10 according to this invention is shown in combination with a fiber-forming bushing 36. The bushing contains molten glass 38 and is comprised of refractory metal walls 40 and is heated by electric current passing through terminals 42. Glass filaments 44 are drawn from orifices 46 in the bushing wall. As the molten glass passes through the orifices it normally assumes the shape of fiber-forming cones 48.

A preferred embodiment will now be more fully described in detail. The chamber comprises a 1 inch diameter cylindrical plenum 22. Air is supplied to the plenum through the inlet means to form a plenum pressure of about 1 to 10 PSIG. Air is supplied to the plenum at a rate within a range of from about 1000 to about 3500 cubic feet per hour. There are approximately 41 apertures and passageways approximately 0.1130 inches in diameter with centers spaced at about 0.250 inches. The skirt has parallel end walls and diverging front and rear walls which form a total angle of divergence of about 15°. There are 40 vanes within the skirt, each parallel to the end walls. Thus each pair of adjacent vanes has only one aperture 18 positioned therebetween.

While the apparatus of this invention is especially useful in directing air toward a fiber-forming bushing, it is to be understood that the invention can also be used for directing other fluids for other purposes.

I claim:
1. A nozzle comprising:
   a. a chamber;
   b. means opening into said chamber;
   c. a plurality of apertures opening from said chamber for discharging a fluid;
   d. a conduit abutting said chamber in open communication with said chamber and surrounding said apertures, said conduit having a rectangular cross-section with two outwardly diverging opposing walls; and, e. a plurality of vane means positioned within said conduit.

2. The nozzle of claim 1 wherein said outwardly diverging opposing walls form a total angle of divergence of from about 2° to about 30°.

3. The nozzle of claim 1 wherein the total angle of divergence is about 15°.

4. The nozzle of claim 1 wherein said vanes are positioned in a substantially parallel arrangement.

5. The nozzle of claim 1 in combination with a glass fiber-forming bushing.

* * * * *